United States Patent [19]
Olano et al.
[11] Patent Number: 4,636,127
[45] Date of Patent: Jan. 13, 1987

[54] CONVEYING SCREW FOR FURNACE

[75] Inventors: Francisco Olano, Miami, Fla.; John A. MacDougall, Pittsburgh; John K. Pargeter, Ellwood City, both of Pa.

[73] Assignee: The International Metals Reclamation Co., Inc., Ellwood City, Pa.

[21] Appl. No.: 719,310

[22] Filed: Apr. 3, 1985

[51] Int. Cl.[4] .............................................. B65G 33/10
[52] U.S. Cl. ...................................... 414/158; 34/183; 414/213; 432/236
[58] Field of Search ............... 414/158, 210, 213, 218, 414/221; 198/952, 676, 662; 34/183; 432/79, 80, 233, 235, 236, 246

[56] References Cited

U.S. PATENT DOCUMENTS

| | | | |
|---|---|---|---|
| 192,069 | 6/1877 | Higbie | 34/183 |
| 233,320 | 10/1880 | Breyer | 198/662 X |
| 2,297,289 | 9/1942 | Collis et al. | 414/213 |
| 3,020,025 | 2/1962 | O'Mara | 34/183 X |
| 3,443,931 | 5/1969 | Beggs et al. | 75/44 R X |
| 3,764,062 | 10/1973 | Brautigam | 198/676 |
| 3,777,810 | 12/1973 | Phillips | 34/183 X |
| 3,800,865 | 4/1974 | Onarheim et al. | 34/183 X |
| 4,466,533 | 8/1984 | Shwayder | 198/676 |

FOREIGN PATENT DOCUMENTS 350467 6/1979 Fed. Rep. of Germany .

OTHER PUBLICATIONS

"Screw Type Ash Coolers for Fluidized Bed Boilers" Power, Sep. 1982.

*Primary Examiner*—Robert J. Spar
*Assistant Examiner*—Stuart J. Millman
*Attorney, Agent, or Firm*—Edward A. Steen; Raymond J. Kenny

[57] ABSTRACT

A countercurrent fluid cooled conveying screw is disclosed. Suitable for furnace applications, the screw includes an outer shaft spatially circumscribing an inner tube. A plurality of hollow, fluid cooled flights are affixed to the outer shaft and are in fluid flow communication with coolant coursing through the screw. The coolant is first directed through the flights and then back through the outer shaft before exiting through the inner tube.

5 Claims, 4 Drawing Figures

CONVEYING SCREW FOR FURNACE

The instant invention relates to furnace design in general and more particularly to a countercurrent fluid cooled discharge screw disposed immediately above the hearth in a rotary hearth furnace.

BACKGROUND

Direct reduction of iron oxide and other metallic oxides may be conducted in rotary hearth furnaces ("RHF") using pelletized or briquetted feed deposited upon the rotating hearth.

Briefly, an RHF is a continuous reheating furnace generally having a circular inner wall circumscribed by a spaced circular inner & outerwall. The void formed therebetween includes a circular rotating hearth. In order to retain the heat generated with the furnace the walls are relatively low so as to enable the roof to be close to the hearth. Burners may be installed in the inner and outer walls and in the roof.

Material is usually loaded (dropped) onto the rotating hearth by a conveyor or chute. After the material is carried on the hearth, it is usually removed by a discharge screw. Due to high temperatures (1300°-2300° F. [704°-1260° C.]) involved, the screw is frequently water cooled. See U.S. Pat. No. 3,443,931. Gases are permitted to vent through a flue located in the roof.

A conventional conveying or discharge screw consists of a central shaft with a solid helical flight welded thereto. A cooling fluid is passed through a bore disposed within the shaft. Other screw designs utilize a plurality of spaced solid flights disposed about the shaft.

Due to corrosive nature of the gases and materials present within the RHF, coupled with the high temperatures therein, the discharge screw is subject to frequent failure. The flights generally deteriorate. Corrosion and erosion caused by high temperatures and bad actors (sodium, sulfides, chlorides, fluorides, potassium lead, zinc, tin, iron, nickel and chromium) within the RHF oftentimes chew up the screws and render them useless after only about three months. Expensive materials such as HH alloy (20% nickel, 20% chromium, remainder iron) as well as IN 659 were not satisfactory.

In addition, the spaces between the flights accumulate fluffy fines which tend to cake together. The fines act as a sponge which serve to collect and concentrate the corrosive gases present within the furnace.

As can be imagined, frequent screw replacement necessitates frequent downtime, high maintenance and labor costs, and inefficient use of the furnace which in turn lead to higher unit costs. Clearly a better screw design is necessary.

SUMMARY OF THE INVENTION

Accordingly, there is provided an improved discharge screw capable of better withstanding the rigors of an RHF.

The screw includes a central shaft and a plurality of helical water cooled flights arranged thereon. The coolant flows through the screw in two stages: Once through the flights and then in a countercurrent fashion back through the screw before being reversed for exit. Moreover, the flights may be faced with a corrosion resistant overlay.

PREFERRED MODE FOR CARRYING OUT THE INVENTION

Figure 1:
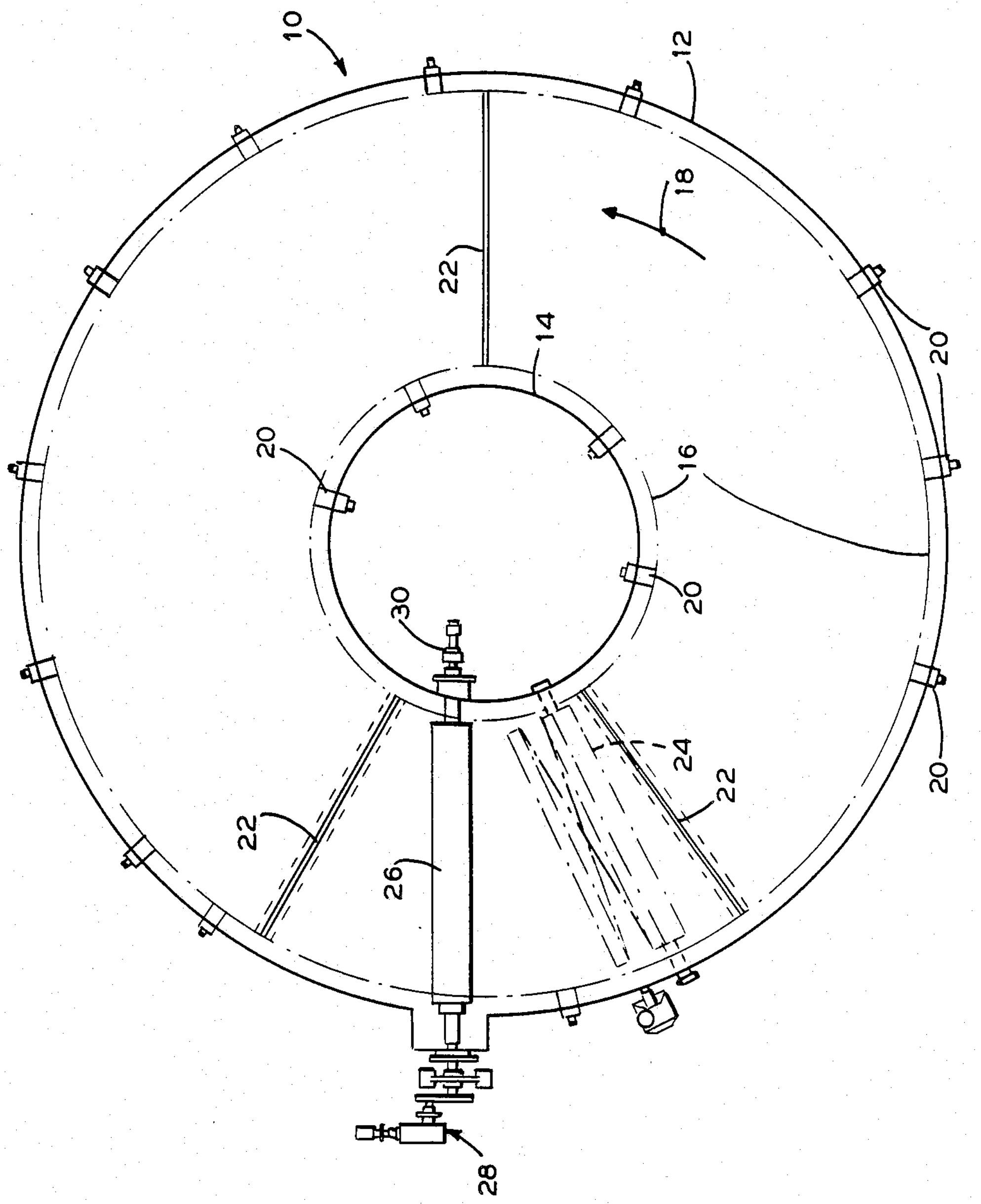
FIG. 1 is a plan view of a rotary hearth furnace.

Referring to FIG. 1, there is shown a greatly simplified view of a rotary hearth furnace (RHF) 10. The RHF 10 includes an insulated outer wall 12 and an insulated inner wall 14. A hearth 16 rotates within the RHF 10 in the direction shown by arrow 18. A plurality of burners 20 are situated about the RHF 10. Curtains 22 divide the RHF 10 into distinct sections. Material is introduced onto the hearth 16 by a feeder 24 mounted in the roof (not shown) of the RHF 10.

After material processing is complete; that is, after almost one complete rotation of the hearth 16, the material is removed by discharge screw 26 and is deposited into a bin (not shown) for subsequent treatment. The discharge screw 26 is driven by motor and mechanical linkage 28. Water is supplied to the screw 26 through coupling 30.

Figure 2:
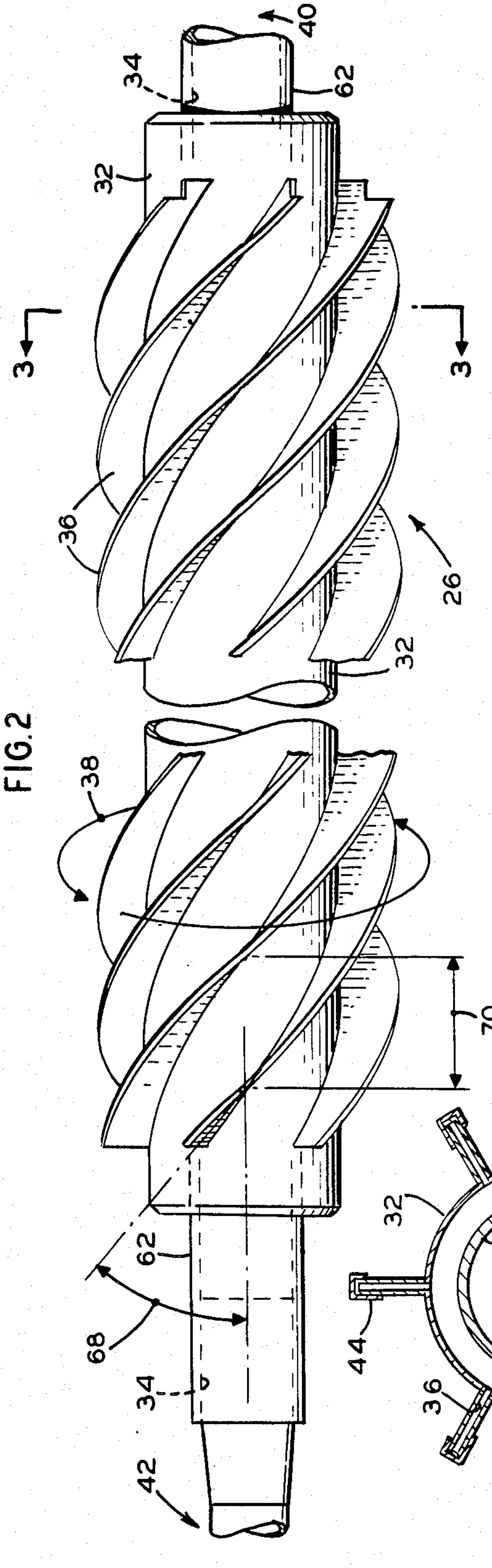
FIG. 2 is a side elevation, of an embodiment of the invention.
Figure 3:
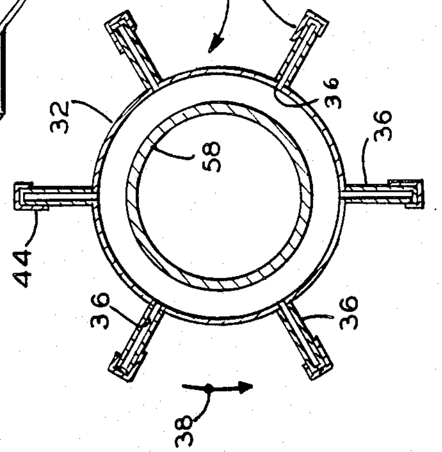
FIG. 3 is a cross sectional view taken along line 3—3 in FIG. 2.

FIGS. 2 and 3 depict the screw 26 in greater detail. The screw 26 includes shaft 32 affixed to two pipes 62 each having an internal bore 34 for water passage therethrough. A plurality of spaced hollow helical flights 36 circumscribe the shaft 32. It is preferred to utilize six or seven flights 36 since more flights will tend to cause particulate matter to cake between the flights 36.

The flights 36 are shown in a clockwise right hand spiral. Accordingly, the screw 26 rotates in direction 38. However, the invention is not limited to this particular embodiment.

Water is introduced into the screw 26 at water coupled end 40 and exits through drive end 42.

The flights 36 are hollow to permit water flow therethrough. Slots 46, formed in two sections of the shaft 32 (see FIG. 4), allow the water to pass from the bore 34 to the flight 36 and vice-versa. A corrosion resistant overlay 44 may be affixed to the leading edge of the flight 36. STELLITE (a trademark) 6 has been utilized as a overlay 44 but it sometimes has cracked after a period of time. The cracks then propagate into the mild steel flight 36 causing small water leaks. Although the experience with the STELLITE alloy has been sometimes disappointing, it is still preferred to use an overlay 44.

Figure 4:
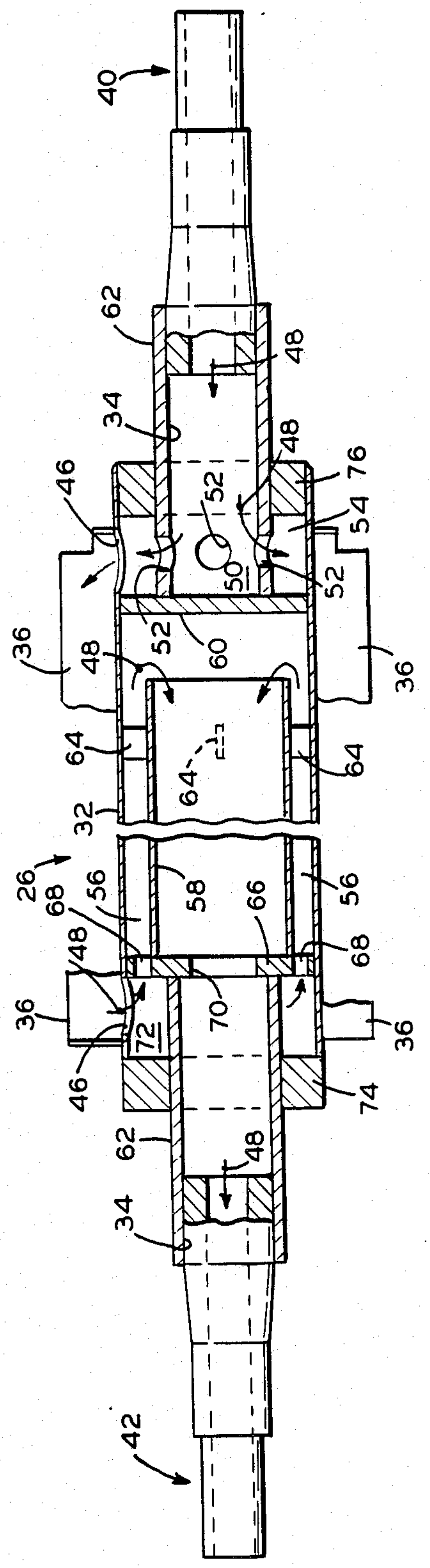
FIG. 4 is a cross sectional view of an embodiment of the invention.

FIG. 4 is a detailed view of the screw 26. The ends 40 and 42 are affixed to appropriate affixing means (not shown) to ensure water-tight integrity and allow for the rotation of the screw 26. Water flow is shown by arrows 48. Caps 74 and 76 prevent the water from leaking out of the screw 26.

The shaft 32, by a series of internal baffles, causes the water to flow in a serpentine or countercurrent flow before exiting.

The water flow 48 first courses through the pipe 62 from the water coupling end 40 whereupon it enters chamber 50. The chamber 50 includes apertures 52 which cause the water to flow into second chamber 54 and then to the flights 36 via the slots 46. Although only one slot 46 is depicted at the water coupled (or proximal) end 40, it should be understood that the number of slots 46 match the number of flights 36.

The water flows through the entire length of the flights 36 towards the distal end 42 where it reenters the shaft 32 through the slot 46 into chamber 72. The water continues to flow through aperture 68 formed in bulkhead 66 into annular space 56 formed between the shaft 32 and inner tube 58. Spacers 64 secure the physical relationship between the shaft 32 and the inner tube 58.

The water flows, in a countercurrent fashion, towards bulkhead 60 where it is reversed again and forced into tube 58. The water, now flowing through tube 58 passes through aperture 70 in the bulkhead 66 towards the distal end 42 and then out of the screw 26.

By forcefully routing the water back towards the proximal end 40 in a counterflow fashion, three cooling operations are conducted simultaneously. Firstly, water flowing through the flights 36 cools the flights 36 and reduces the possibility of flight 36 deterioration. Secondly, the water flowing back through the annular space 56 cools the shaft 32 area between the flights 36. This area becomes caked with hot material which if not cooled will hasten the demise of the screw 26. Thirdly, the water flowing through the tube 58 and the pipe 62 keeps these components relatively cool.

In experimental tests, the screw 26 has lasted approximately two to three times longer than a conventional water cooled solid flight discharge screw. Such screws, on average, lasted only two to three months whereas the instant screw 26 has lasted from four to nine months. Moreover, by utilizing the instant design, it is possible to fabricate the screw 26 out of mild steel rather than expensive exotic alloys.

The pitch, lead angle, length and number of the fights are, of course, a function of the size of the RHF, the environment and material to treated within the RHF. Under particular conditions, the temperature within the RHF was about 1800° F. (982° C.) and the flights were about 16.25 feet (4.9 meters) long. The outer shaft 32 was about 1.5 feet (0.45 meter) in diameter with the entire shaft 32 about 17.2 feet (5.2 meters) long. The lead angle 68 was about 35° 15′ and the pitch 70 was about 13.3 inches (33.8 centimeters). See FIG. 2. Due to the cooling capability of the screw 26, the water temperature entered the screw 26 at about 90° F. (32.2° C.) and exited the screw 26 at about 120° F. (49° C.) at a flow rate of about 300 gallons per minute (1136 /min.) at about 10–15 pounds per square inch (69–103 KPa).

In accordance with the provisions of the statute, there is illustrated and described herein specific embodiments of the invention. Those skilled in the art will understand that changes may be made in the form of the invention covered by the claims and the certain features of the invention may sometimes be used to advantage without a corresponding use of the other features.

The embodiments of the invention in which an exclusive property or privilege is claimed are defined as follows:

1. In combination with a furnace (10), a fluid cooled conveying screw (26) disposed therein, the conveying screw (26) comprising a proximal end (40), a distal end (42) and a hollow shaft (32) disposed therebetween, a plurality of spaced, continuous, fluid cooled, hollow, helical flights (36) affixed to the exterior of the shaft (32), coolant fluid entrance slots (46) disposed towards the proximal end (40), each coolant fluid entrance slot (46) communicating with an individual flight (36), coolant fluid exit slots (46) disposed towards the distal end (42), each coolant fluid exit slot (46) communicating with an individual flight (36), an inner tube (58) disposed within the shaft (32) communicating with the distal end (42) and partially extending through the shaft (32), and the shaft (32) and the inner tube (58) forming an annular space (56) therebetween wherein fluid flows from the entrance slots (46) through the helical flights (36) and through the exit slots (46) through the annular space (56) and out the distal end (42) of the shaft (32).

2. The combination according to claim 1 including a first bulkhead (60) disposed within the shaft (32) immediately after the coolant fluid entrance slots (46), a second bulkhead (66) disposed with the shaft (32) immediately before the coolant fluid exit slots (46), the inner tube 58 affixed to the second bulkhead (66) and extending towards the first bulkhead (60), and the second bulkhead (66) including a first aperture (68) communicating with the annular space (56) and a second aperture (70) communicating with the interior of the inner tube (58).

3. The combination according to claim 2 including a proximal pipe (62) attached to the conveying screw (26) and in fluid flow communication with the coolant fluid entrance slots (46) and a distal pipe (62) attached to the conveying screw (26) and in fluid flow communication with the inner tube (58).

4. The combination according to claim 3 including the proximal pipe (62) affixed to the first bulkhead (60) and the distal pipe (62) affixed to the second bulkhead (66), and the proximal pipe (62) including at least one third aperture (52) adjacent to a coolant fluid entrance slot (46).

5. The combination according to claim 1 wherein the flights (36) include heat, corrosion and erosion resistant materials for use in a furnace.

* * * * *